US006971639B2

(12) United States Patent
Okada et al.

(10) Patent No.: US 6,971,639 B2
(45) Date of Patent: Dec. 6, 2005

(54) ORIFICE DEVICES WITH LOCK MECHANISMS, VIBRATION ABSORPTION DEVICES HAVING THE ORIFICE DEVICES, AND METHODS OF ASSEMBLING THE ORIFICE DEVICES

(75) Inventors: Hiroki Okada, Aichi-ken (JP); Yasunori Makiuchi, Aichi-ken (JP); Takanobu Nanno, Aichi (JP); Hideki Maehashi, Aichi (JP); Akio Saiki, Aichi (JP)

(73) Assignees: Kabushiki Kaisha Togo Seisakusho, Aichi-ken (JP); Tokai Rubber Industries, Ltd., Aichi-ken (JP)

( * ) Notice: Subject to any disclaimer, the term of this patent is extended or adjusted under 35 U.S.C. 154(b) by 0 days.

(21) Appl. No.: 10/692,806

(22) Filed: Oct. 27, 2003

(65) Prior Publication Data

US 2004/0084819 A1 May 6, 2004

(30) Foreign Application Priority Data

Oct. 25, 2002 (JP) ............................ 2002-311265

(51) Int. Cl.[7] ................................................ F16F 13/00
(52) U.S. Cl. .................................... 267/140.13; 29/240
(58) Field of Search ...................... 267/140.11, 140.13, 267/140.14; 138/30; 29/240

(56) References Cited

U.S. PATENT DOCUMENTS 4,422,779 A * 12/1983 Hamaekers et al. .......... 384/99
4,613,118 A * 9/1986 Morita .................. 267/140.13
4,657,232 A * 4/1987 West ..................... 267/140.13
4,681,306 A * 7/1987 Hofmann et al. ...... 267/140.13
4,709,907 A * 12/1987 Thorn ................... 267/140.13
4,753,422 A * 6/1988 Thorn ................... 267/140.13
4,856,750 A * 8/1989 Le Fol ....................... 248/562
4,887,801 A * 12/1989 Wolf et al. ............ 267/140.13
4,896,867 A * 1/1990 Schyboll et al. ....... 267/140.13
5,028,038 A * 7/1991 de Fontenay .......... 267/140.13
5,205,546 A * 4/1993 Schisler et al. ........ 267/140.13
5,735,511 A * 4/1998 Stocker et al. ......... 267/140.13
6,662,683 B1 * 12/2003 Takahashi et al. ........ 74/573 F

FOREIGN PATENT DOCUMENTS

JP 2001108008 4/2001

* cited by examiner

*Primary Examiner*—Robert A. Siconolfi

(74) *Attorney, Agent, or Firm*—Dennison, Schultz, Dougherty & MacDonald

(57) ABSTRACT

An orifice device is adapted to be disposed within a fluid chambers of a vibration absorption device. The fluid chamber is defined by at least a wall portion made of resilient material. The orifice device includes an orifice casing, a retaining cover and a membrane that is made of resilient material, such as rubber. The membrane is adapted to be clamped between the orifice casing and the retaining cover. A lock mechanism serves to lock the orifice casing and the retaining cover together when the orifice casing and the retaining cover rotate relative to each other about an axis while the orifice casing and the retaining cover are overlapped with each other.

13 Claims, 6 Drawing Sheets

ORIFICE DEVICES WITH LOCK MECHANISMS, VIBRATION ABSORPTION DEVICES HAVING THE ORIFICE DEVICES, AND METHODS OF ASSEMBLING THE ORIFICE DEVICES

This application claims priority to Japanese patent application serial number 2002-311265, the contents of which are incorporated herein by reference.

BACKGROUND OF THE INVENTION

1. Field of the Invention

The present invention relates to orifice devices for use with vibration absorption devices that sealingly contain liquids. The present invention also relates to vibration absorption devices having such orifice devices and methods of assembling the orifice devices.

2. Description of the Related Art

FIG. 12 shows a conventional orifice device 108 for use with a vibration absorption device that sealingly contains a liquid. The orifice device includes an orifice casing 110, a retaining cover 120 and a flexible membrane 130. The retaining cover 120 is press fitted into the orifice casing 110. The flexible membrane 130 is clamped between the orifice casing 110 and the retaining cover 120 and is made of resilient material. This type of conventional orifice device is disclosed in Japanese Laid-Open Patent Publication No. 2001-108008 and is used to be disposed within a fluid chamber of a vibration absorption device (not shown) that sealingly contains a liquid. In general, the fluid chamber has at least a wall portion that is made of resilient material, such as rubber.

However, with this conventional orifice device 108, a possibility has existed that the flexible membrane 130 may not be reliably clamped due to reduction of strength of the joint region of the orifice casing 110 and the retaining cover 120 depending on the press fitting condition of the retaining cover 120 into the orifice casing 110 or the sizes of the orifice casing 110 and the retaining cover 120. In case that the orifice casing 110 and the retaining cover 120 are made of resin, the orifice casing 110 and the retaining cover 120 may be joined together by using a welding technique, such as supersonic-wave welding technique. However, also in this case, the same problems as the problems involved when using the press-fitting technique may be caused depending on the welding condition.

SUMMARY OF THE INVENTION

It is accordingly an object of the present invention to teach improved techniques for reliably clamping a flexible membrane between an orifice casing and a retaining cover of an orifice device.

According to one aspect of the present teachings, orifice devices for use with vibration absorption devices are taught. The orifice device is adapted to be disposed within a fluid chamber of the vibration absorption device. The fluid chamber may be defined by at least a wall portion made of resilient material. The orifice device includes an orifice casing, a retaining cover and a membrane that is made of resilient material, such as rubber. The membrane is adapted to be clamped between the orifice casing and the retaining cover. A lock mechanism serves to lock the orifice casing and, the retaining cover together when the orifice casing and the retaining cover rotate relative to each other about an axis while the orifice casing and the retaining cover are lapped with each other. Therefore, the lock mechanism will be hereinafter also called "twist lock mechanism."

Because the orifice casing and the retainer cover can be assembled to each other by the lock mechanism that does not require a press-fitting operation and a welding operation, the strength of a joint portion between the orifice casing and the retainer cover may not be influenced by press-fitting conditions or welding conditions. As a result, the membrane can be properly clamped between the orifice casing and the retainer cover.

In one embodiment, the lock mechanism includes a first engaging member and a second engaging member disposed on one and the other of the orifice casing and the retaining cover, respectively. The fist engaging member includes an engaging projection that has an engaging recess. The second engaging member includes an engaging hole and an engaging edge. The engaging hole has a projection receiving portion and an engaging portion arranged in series in the rotational direction of the orifice casing or the retaining cover. The projection receiving portion is configured to receive the engaging projection of the first engaging member when the orifice casing and the retaining cover are positioned to be lapped with each other. The engaging edge is defined by the engaging portion and is configured to engage the engaging recess of the fist engaging member. The orifice casing and the retaining cover are prevented from being removed from each other in an axial direction, when the retaining cover is rotated in one direction relative to the orifice casing after the engaging projection has been received by the projection receiving portion.

With this arrangement, the lock mechanism may have a compact construction and can be advantageously used for the vibration prevention device.

The engaging projection may further include a rotation prevention wall that is configured to oppose to the engaging edge in the rotational direction, so that the retaining cover is prevented from rotating further in the rotational direction after the engaging edge has engaged with the engaging recess.

Preferably, the membrane may be compressed between the orifice casing and the retaining cover when the engaging edge engages the engaging recess, so that a force is applied by the membrane to press the engaging edge and the engaging projection against each other in the axial direction of the orifice casing or the retaining cover. With this arrangement, the lock condition can be reliably maintained and no rattling may be caused between the orifice casing and the retaining cover.

In another embodiment, the first engaging member is disposed on the orifice casing and the second engaging member is disposed on the retaining cover.

Preferably, the first engaging member is formed integrally with the orifice casing and the second engaging member is formed integrally with the retaining cover.

In another embodiment, a plurality of first engaging members are disposed on an end portion in the axial direction of the orifice casing and are spaced substantially equally from each other in the circumferential direction. In addition, a plurality of second engaging members are disposed on the retaining cover and are spaced substantially equally from each other in the circumferential direction for engagement with the corresponding first engaging members.

Preferably, the first engaging members are formed integrally with the end portion of the orifice casing and the second engaging members are formed integrally with the retaining cover.

In another embodiment, the orifice casing includes a helical groove formed in an outer peripheral surface thereof. The helical groove has one end that opens at the end portion of the orifice casing via a communication opening. The retaining cover has a communication slot configured to communicate with the communication opening. Preferably, the engaging projections of two of the first engaging members are disposed on both sides of the communication opening in the circumferential direction and the engaging holes of two of the second engaging members are disposed on both sides of the communication slot in the circumferential direction in continuity with the communication slot.

According to another aspect of the present teachings, vibration absorption devices are taught that include the orifice device as described above.

The vibration absorption devices may further include a first mount adapted to be mounted on a vehicle engine and a second mount adapted to be mounted on a vehicle body. A resilient member may be disposed between the first and second mounts and may define the fluid chamber. A diaphragm may be disposed within the resilient member at a position below the orifice device, so that the fluid chamber is separated into a pressure receiving section on the upper side of the orifice device and a pressure balancing section on the lower side of the orifice device. The orifice casing of the orifice device includes a helical groove formed in an outer peripheral surface thereof, so that an orifice channel is formed between the outer peripheral surface of the orifice casing and an inner wall of the fluid chamber and communicates between the pressure receiving section and the pressure balancing section. The lock mechanism is positioned within the pressure balancing section such that the lock mechanism does not interfere with the diaphragm. With this construction, the vibration absorption device can be advantageously used for reducing transmission of vibrations from the vehicle engine to the vehicle body.

In another aspect of the present teachings, methods are taught for assembling the orifice devices. The methods comprise the steps of positioning the orifice casing and the retaining cover to be lapped with each other in the axial direction while the membrane is interposed between the orifice casing and the retaining cover, pressing the orifice casing and the retaining cover against each other in the axial direction, so that a part of the membrane is resiliently deformed, rotating the orifice casing and the retaining cover relative to each other, so that the orifice casing and the retaining cover are locked together by the lock mechanism, and releasing the pressing force applied to the orifice casing and the retaining cover.

With these methods, the orifice device can be easily assembled by a simple operation. In addition, the lock condition can be reliably maintained by the pressing force applied by the membrane.

In one embodiment, the methods comprise the steps of positioning the orifice casing and the retaining cover to be lapped with each other in the axial direction while the membrane is interposed between the orifice casing and the retaining cover, so that the engaging projection of the first engaging member of the lock mechanism is received by the projection receiving portion of the engaging hole of the second engaging member, pressing the orifice casing and the retaining cover against each other in the axial direction, so that a part of the membrane is resiliently deformed, rotating the orifice casing and the retaining cover relative to each other, so that the engaging projection moves from the projection receiving portion to the engaging portion along the engaging hole and the engaging edge of the second engaging portion engages the engaging recess of the first engaging member, and releasing the pressing force applied to the orifice casing and the retaining cover.

DETAILED DESCRIPTION OF THE INVENTION

Each of the additional features and teachings disclosed above and below may be utilized separately or in conjunction with other features and teachings to provide improved orifice devices and vibration absorption devices and methods of using such improved orifice devices and vibration absorption devices. Representative examples of the present invention, which examples utilize many of these additional features and teachings both separately and in conjunction, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

Figure 1:
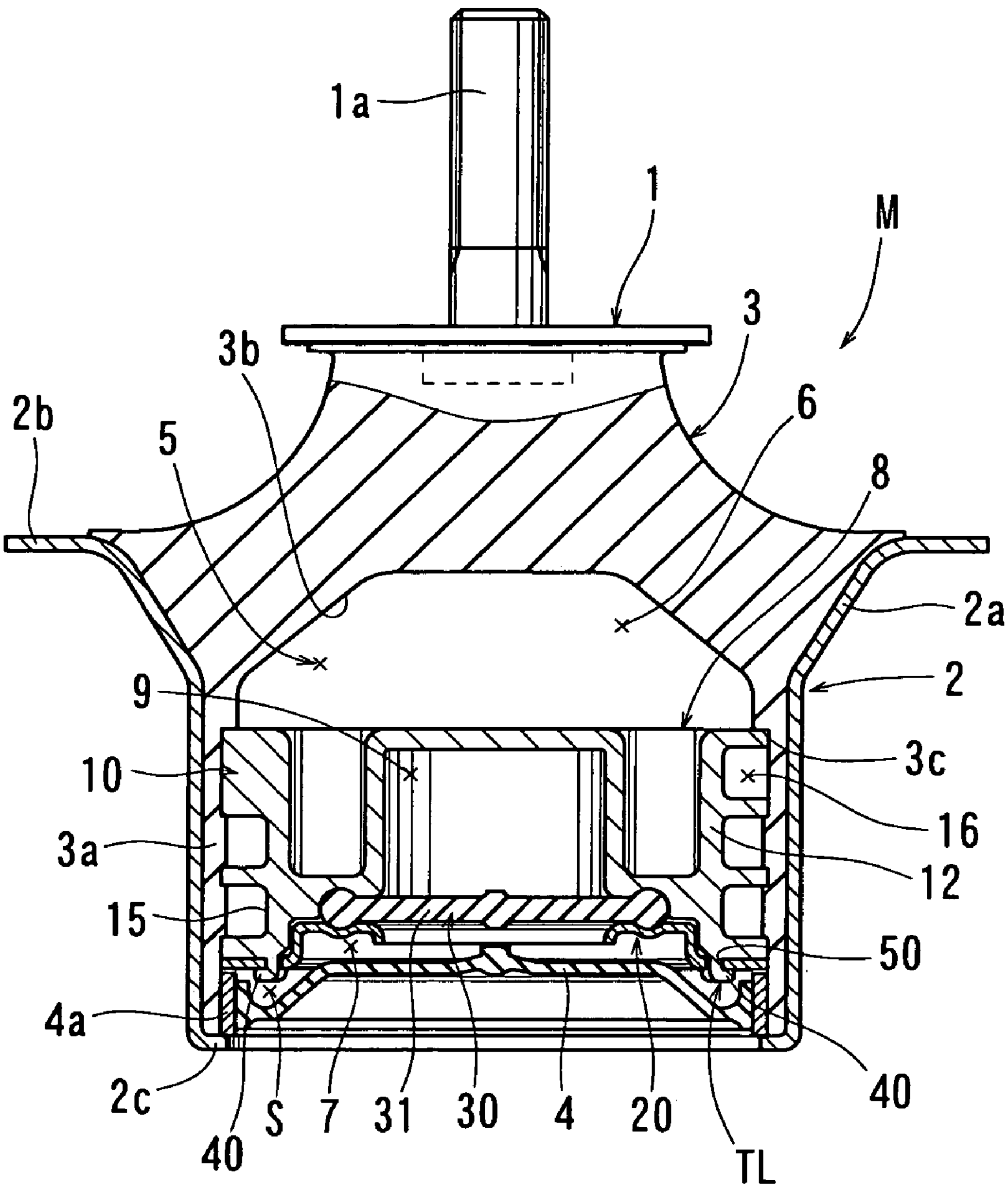
FIG. 1 is a vertical sectional view of a representative vibration absorption device that sealingly contains a liquid.

A representative embodiment of the present invention will now be described with reference to FIGS. 1 to 11. A representative vibration absorption device M sealingly contains a fluid and is configured as an engine mount for supporting a power unit (not shown) including an engine against an automobile body (not shown) in order to absorb vibrations of the power unit. Referring to FIG. 1, the vibration absorption device M includes a first mount 1, a second mount 2 and a resilient member 3 that is made of rubber. The first mount 1 may be made of metal and may have a substantially disk-shaped configuration. A mount bolt 1*a* is attached to the central portion of the first mount 1 and extends upward therefrom, so that the first mount 1 can be mounted to the power unit, which may be a source of vibrations of the automobile, via the mount bolt 1*a*. The second mount 2 also may be made of metal and may have a substantially cylindrical tubular configuration. The upper portion of the second mount 2 is configured as a tapered portion 2*a* that has a diameter increasing in the upward direction. The upper portion has a flange 2*b* that extends radially outward from the upper end of the upper portion. The lower portion of the second mount 2 has a substantially straight configuration and is radially and inwardly crimped at a lower end 2*c*. The second mount 2 is adapted to be mounted to the automobile body. The upper portion of the resilient member 3 has a substantially truncated conical configuration and has an upper surface on which the first mount 1 is attached by using a vulcanization bonding technique. The lower portion of the resilient member 3 is configured as a cylindrical tubular portion 3*a* and the inner peripheral surface of the second mount 2 is attached to the outer peripheral surface of the second mount 2 by also using a vulcanization bonding technique. In this way, the first mount 1 and the second mount 2 are joined to each other via the resilient member 3. A hollow space 3*b* is formed in the upper portion of the resilient member 3 and communicates with the inner space of the tubular portion 3*a*.

A diaphragm 4 is disposed within the tubular portion 3*a* of the resilient member 3 in a position adjacent to the lower end of the tubular portion 3*a*. Preferably, the diaphragm 4 is made of rubber and has a disk-like configuration, so that the diaphragm 4 can be resiliently deformed or is flexible. A substantially annular ring 4*a* is attached to the outer periphery of the diaphragm 4 by using a vulcanization bonding technique. Preferably, the annular ring 4*a* is fixed in position relative to the second mount 2 at the same time the second mount 2 is crimped at the lower end 2*c*. Therefore, the lower open end of the tubular portion 3*a* of the resilient member 3 may be closed by the diaphragm 4 and may be sealed to prevent leakage of a fluid, so that a fluid chamber 5 is defined by the diaphragm 4 within the resilient member 3. A liquid, such as polyethylene glycol, water or alkylene glycol is filled within the fluid chamber 5. The lower side of the diaphragm 4 is exposed to the atmosphere. Although the fluid chamber 5 is defined by the inner wall of the resilient member 3 and the diaphragm 4 in this representative embodiment, the first mount 1 may define a part of the fluid chamber 5 in conjunction with the resilient member 3. In other words, the fluid chamber 5 may be configured in various ways as long as it has at least a wall portion that is formed by the resilient member 3.

An orifice device 8 is disposed within the tubular portion 3*a* of the resilient member 3 and is positioned adjacent to the upper side of the diaphragm 4. Preferably, the orifice device 8 is fixed in position relative to the tubular portion 3*a* as the annular ring 4*a* is fixed in position relative to the second mount 2 by the crimping operation of the lower end 2*c*. The orifice device 8 serves to separate the fluid chamber 5 into an upper pressure-receiving section 6 and a lower pressure-balancing section 7. The outer periphery of the upper end of the orifice device 8 is pressed against an annular shoulder portion 3*c* formed within the upper end of the tubular portion 3*a* of resilient member 3 so as to provide a seal against leakage of a fluid. Thus, the orifice device 8 is clamped between the crimped lower end 2*c* of the second mount 2 and the shoulder 3*c* of the resilient member 3 so as to be fixed in position.

Figure 2:
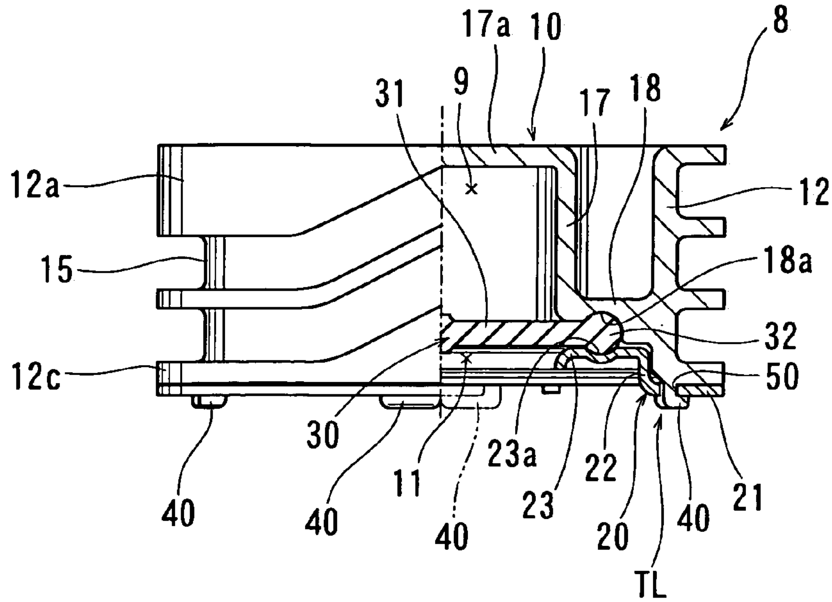
FIG. 2 is a side view, with a part shown in sectional view, of a representative orifice device.
Figure 4:
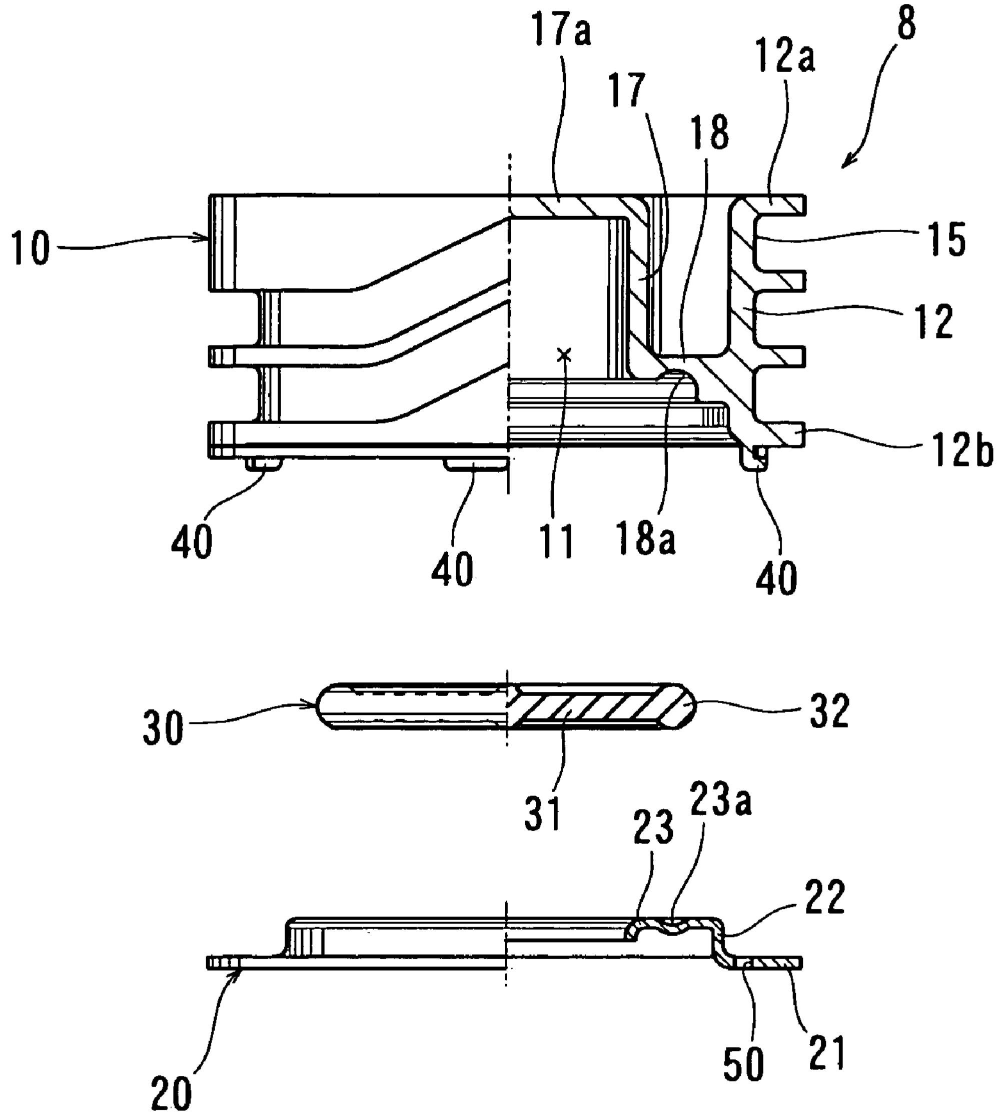
FIG. 4 is an exploded view of the orifice device.
Figure 5:
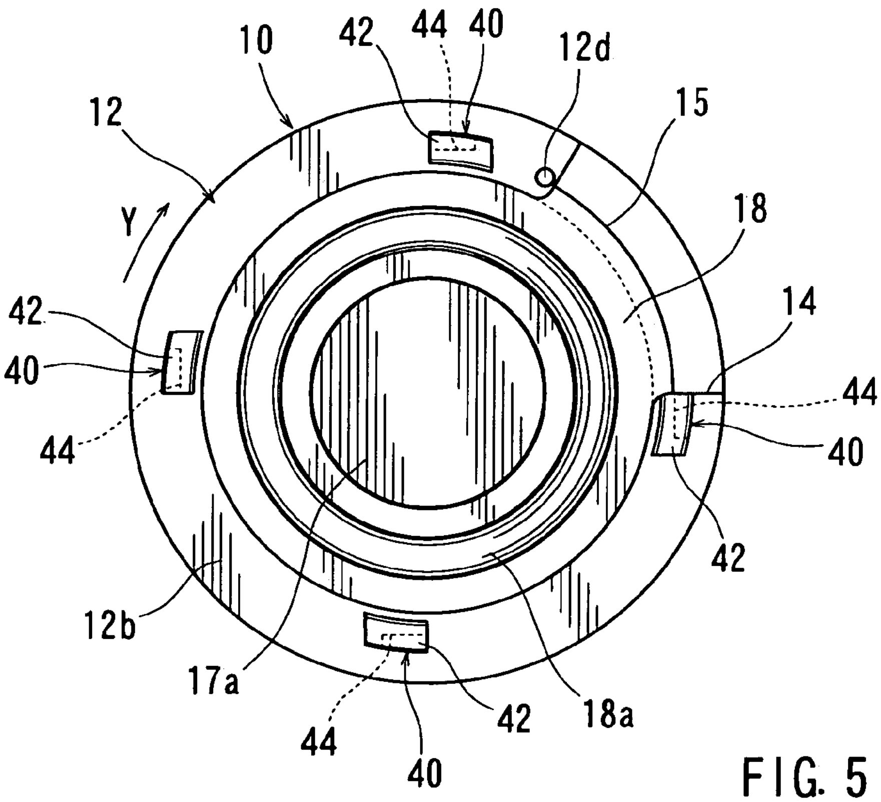
FIG. 5 is a bottom view of an orifice casing of the orifice device.

The orifice device 8 will now be described. Referring to FIGS. 1, 2 and 4, the orifice device 8 has an orifice casing 10, a retaining cover 20 and a flexible membrane 30. The orifice casing 10 may be made of resin, such as PPS, and may include a substantially cylindrical tubular wall 12, an inner tubular portion 17, and an annular interconnection wall 18. The inner tubular portion 17 has a substantially cylindrical configuration and has an upper end closed by a top wall 17*a*. The interconnection wall 18 interconnects the lower end of the inner tubular portion 17 and the inner wall surface of the tubular wall 12 with each other. In addition, an inner space 11 is defined within the inner tubular portion 17 and is open at the lower side. A helical groove 15 is formed in an outer surface of the tubular wall 12. A lower end wall portion 12*b* of the tubular wall 12 defines the lowermost part of the helical groove 15 and has a lower communication opening 14 (see FIG. 5), so that the lower end of the helical groove 15 is open at the lower end of the tubular wall 12 via the lower communication opening 14. On the other hand, referring to FIG. 4, an upper end wall portion 12*a* of the tubular wall 12 defines the uppermost part of the helical groove 15 and has an upper communication opening (not shown), so that the upper end of the helical groove 15 is open at the upper end of the tubular wall 12 via the upper communication opening. As shown in FIG. 5, the lower communication opening 14 extends within a plane below the lower end of the interconnection wall 18. An annular recess 18*a* is formed in the lower surface of the interconnection wall 18 in an intermediate position in the radial direction of the lower surface. Preferably, the annular recess 18*a* has a semi-circular cross section. In addition, as shown in FIG. 4, a part of the lower surface of the interconnection wall positioned inside of the annular recess 18*a* in the radial direction extends at a higher level than a part of the lower surface positioned outside of the annular recess 18*a*.

Figure 9:
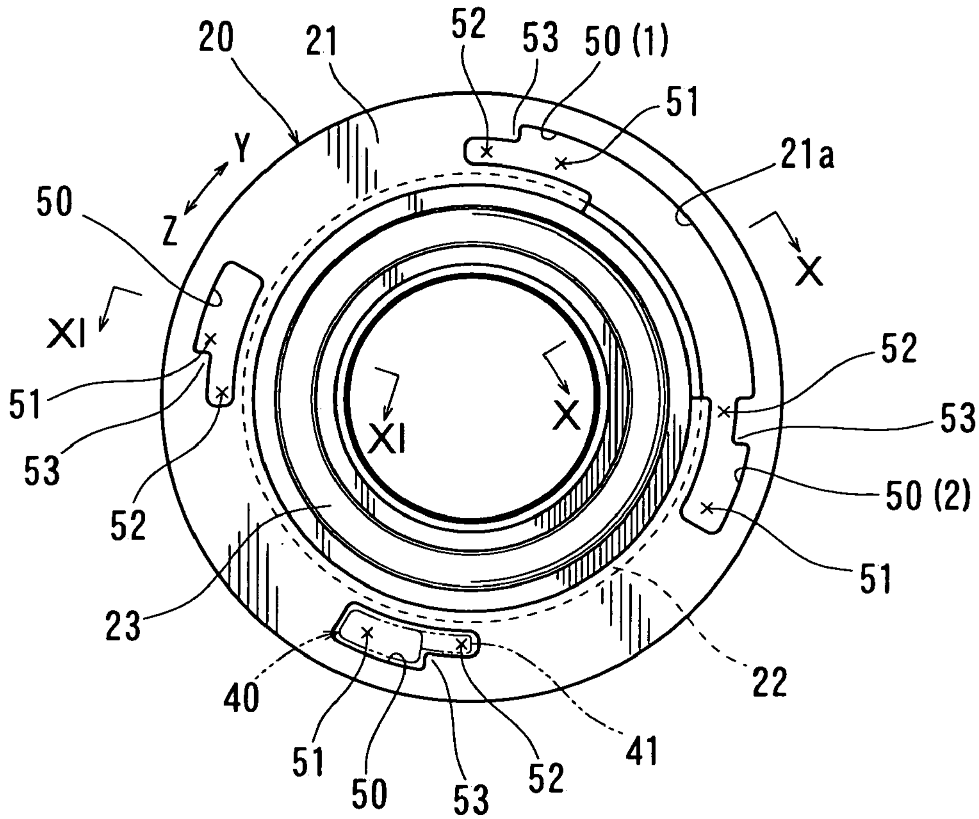
FIG. 9 is a bottom view of a retaining cover of the orifice device.
Figure 10:
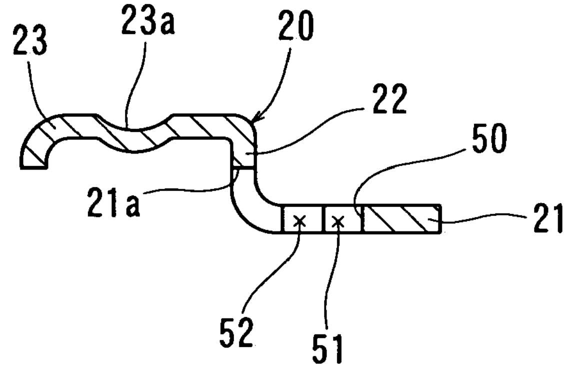
FIG. 10 is a sectional view taken along line X—X in FIG. 9.

Referring again to FIG. 4, the retaining cover 20 has a substantially annular configuration and is made of metal, such as SPCC. Preferably, the retaining cover 20 may be formed by a press working of a sheet metal. The retaining cover 20 has a mount flange 21 and a retaining flange 23 that are disposed at the outer periphery and the inner periphery of the retaining cover 20, respectively. The retaining cover 20 also has a vertical wall 22 that extends upward from the inner peripheral edge of the mount flange 21 to the outer peripheral edge of the retaining flange 23. The mount flange 21 is configured to be lapped with the lower end surface of the tubular wall 12 of the orifice casing 10 in the assembled state shown in FIG. 2. Referring to FIG. 9, a substantially arc-shaped communication slot 21*a* is formed in the mount flange 21. As shown in FIG. 10, the inside edge of the communication slot 21*a* extends into the lower portion of the vertical wall 22. The communication slot 21*a* is adapted to communicate with the lower communication opening 14 (see FIG. 5) of the orifice casing 10. In addition, as shown in FIG. 2, the vertical wall 22 is configured to be fitted into the lower end portion of the tubular wall 12 of the orifice casing 10. As shown in FIG. 4, the upper surface of the retaining flange 23 is configured to conform to the lower surface of the interconnection wall 18 and has an annular recess 23*a* that is formed in an intermediate position in the radial direction of the retaining flange 23. The retaining cover 20 may be coupled to the orifice casing 10 by means of a twist lock mechanism TL shown in FIG. 2. To this end, the retaining cover 20 is positioned to be lapped with the orifice casing 10 and is then rotated relative to the orifice casing 10, so that the retaining cover 20 is engaged by the orifice casing 10 via the twist lock mechanism TL not to be removed from the orifice casing 10. The details of the twist lock mechanism TL will be explained later.

Referring again to FIG. 4, the flexible membrane 30 is made of rubber and includes a substantially disk-like membrane portion 31 and an attachment portion 32. The attachment portion 32 is disposed at the outer periphery of the membrane portion 32 and is bulged to have a substantially circular cross section. As shown in FIG. 2, the attachment portion 32 is adapted to be positioned and held between the interconnection wall 18 of the orifice casing 10 and the retaining flange 23 of the retaining cover 20 while the attachment portion 32 is fitted into the annular recesses 18*a* and 13*a* and is compressed due to its resiliency. The membrane portion 31 is resiliently deformable so as to be flexed. In addition, as shown in FIG. 2, the flexible membrane 30 defines a liquid-sealed auxiliary fluid chamber 9 within the inner tubular portion 17 of the orifice casing 10. The auxiliary fluid chamber 9 communicates with the helical groove 15 via a communication channel (not shown).

As described previously, the orifice device 8 is adapted to be disposed within the fluid chamber 5 of the vibration absorption device M (see FIG. 1). During the assembling operation, the orifice casing 10 is inserted into the tubular portion 3*a* of the resilient member 3 such that the outer peripheral surface of the orifice casing 10 closely contacts with the inner wall of the tubular portion 3*a*. Therefore, the outer open side of the helical recess 15 is closed by the inner wall of the tubular portion 3*a*. As a result, an orifice channel 16 is defined by the helical recess 15. The upper end of the orifice channel 16 communicates with the pressure receiving section 6 via the upper communication opening of the orifice casing 10. On the other hand, the lower end of the orifice channel 16 communicates with the pressure balancing section 7 via the lower communication opening 14 (see FIG. 5) of the orifice casing 10 and the communication slot 21*a* (see FIG. 9) of the retaining cover 20. In addition, the orifice channel 16 communicates with the auxiliary fluid chamber 9 via the communication channel (not shown). As a result, when vibrations are transmitted to the vibration absorption device M, in particular to the resilient member 3 disposed between the first mount 1 and the second mount 2, the resilient member 3 resiliently deforms to produce pressure variation in the pressure receiving section 6 due to the flow of the liquid within the pressure receiving section 6. The auxiliary chamber 9 is permitted to change its volume when the membrane portion 31 of the flexible membrane 30 is resiliently deformed due to the flow of the liquid within the pressure receiving section 6. The pressure balancing section 7 also is permitted to change its volume when the diaphragm 4 is deformed due to the flow of the liquid within the pressure receiving section 6.

The twist lock mechanism TL will now be described in detail. As described previously with reference to FIG. 2, the twist lock mechanism TL serves to prevent the orifice casing 10 from being removed from the retaining cover 20 through engagement with the retaining, cover 20 as the orifice casing 10 is rotated relative to the orifice casing 10 with the retaining cover 20 positioned to be lapped with the orifice casing 10. The twist lock mechanism TL includes a suitable number of engaging projections 40 and engaging holes 50. In this representative embodiment, four engaging projections 40 and four engaging holes 50 are provided. The engaging projections extend from the lower end surface of the tubular wall 12 of the orifice casing 10. The engaging holes 50 are formed in the mount flange 21 of the retaining cover 20 and are positioned to correspond to the engaging projections 40.

Figure 6:
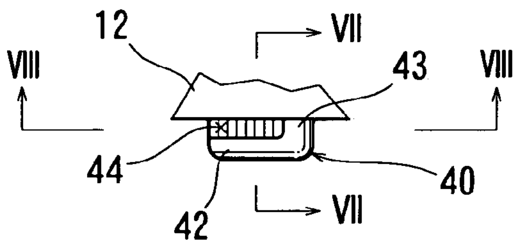
FIG. 6 is a side view of one of engaging projections.
Figure 7:
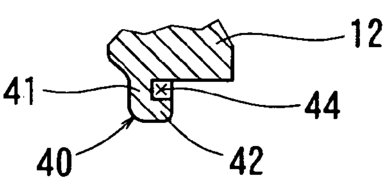
FIG. 7 is a sectional view taken along line VII—VII in FIG. 6.
Figure 8:
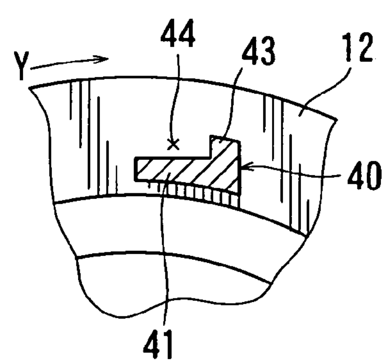
FIG. 8 is a sectional view taken along line VIII—VIII in FIG. 6.

As shown in FIG. 5, the engaging projections 40 are spaced equally from each other in the circumferential direction of the lower end surface of the tubular wall 12. As shown in FIG. 7, each of the engaging projections 40 includes a side wall 41 and a removal prevention wall 42. Referring to FIG. 7, the side wall 41 extends downward from the lower end surface of the tubular wall 12 and has a configuration elongated in the circumferential direction (a direction perpendicular to the sheet of FIG. 7) of the lower end surface. The removal prevention wall 42 extends from the lower end (as viewed in FIG. 7) of the side wall 12 in a direction radially outward (rightward as viewed in FIG. 7) of the lower end surface of the tubular wall 12. The side wall 41 and the removal prevention wall 42 cooperate to define an engaging recess 44 that extends along the lower end surface of the tubular wall 12. Referring to FIGS. 6 and 8, each of the engaging projections 40 includes a rotation prevention wall 43 that is positioned to define an end wall to close one end of the engaging recess 44 in the circumferential direction. In this representative embodiment, the engaging recess 44 is closed at one end in a clockwise direction as viewed from the side of the lower end surface of the tubular wall 12 (right end as viewed in FIG. 8). In this specification, the terms "clockwise direction" and "counterclockwise direction" are used to indicate directions as viewed from the side of the lower end surface of the tubular wall 12 , i.e., the side of the lower surface of the orifice casing 10 and the retaining cover 20, unless particularly indicated.

Figure 11:
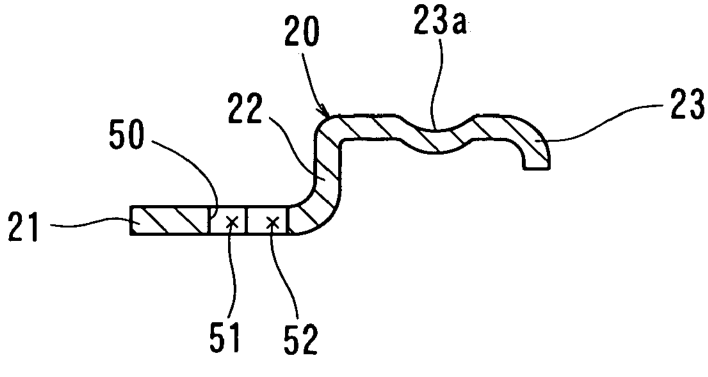
FIG. 11 is a sectional view taken along line XI—XI in FIG. 9.
Figure 12:
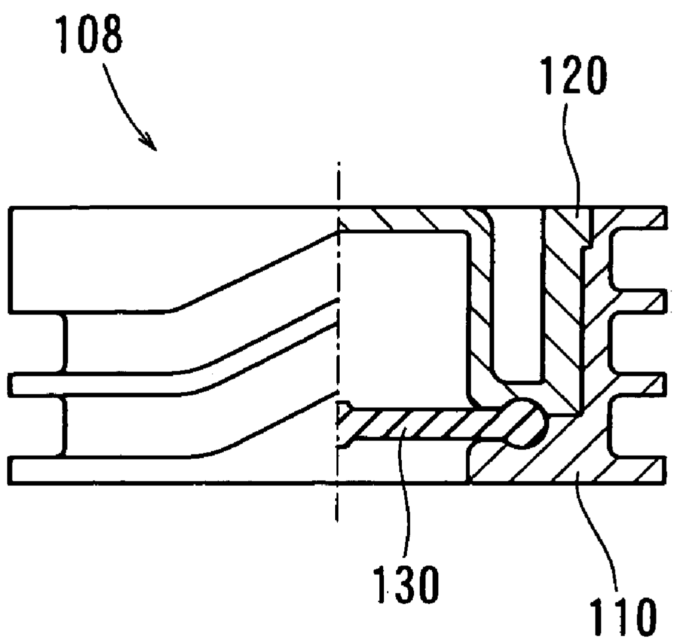
FIG. 12 a side view, with a part shown in sectional view, of the conventional orifice device for use with a vibration absorption device that sealingly contains a liquid.

Referring to FIG. 9, the engaging holes 50 are spaced equally from each other in the circumferential direction of the mount flange 21. Each of the engaging holes 50 has a projection receiving portion 51 and an engaging hole portion 52. As shown in FIG. 11, the width of the projection receiving portion 51 in the radial direction of the retaining cover 20 is narrower than the width of the engaging hole portion 52 in the same direction. The engaging hole portion 52 communicates with one end of the projection receiving portion 51 in the counterclockwise direction (a direction indicated by an arrow Z in FIG. 9). The inner edge in the radial direction of the engaging hole portion 52 extends in continuity with the inner edge of the projection receiving portion 51. Each of the engaging projections 40 can be entirely fitted into the fitting recess portion 51 of the corresponding engaging hole 50 as indicated by chain lines in FIG. 9 when the retaining cover 20 is positioned to be lapped with the orifice casing 10 as shown in FIG. 2. The engaging hole portion 52 is configured to receive the side wall 41 of the corresponding engaging projection 40 as indicated by chain lines in FIG. 9 as the retaining cover 20 is rotated in the clockwise direction (a direction indicated by an arrow Y in FIG. 9) after the retaining cover 20 has been lapped with the orifice casing 10 (see FIG. 2). In addition, an engaging edge 53 (see FIG. 9) is configured to engage the engaging recess 44 of the corresponding engaging projection 40 and to contact the rotation prevention wall 43 (see FIG. 6) of the engaging projection 40 as the retaining cover 20 is rotated. As shown in FIG. 9, the engaging edge 53 is defined by a stepped portion between the projection receiving portion 51 and the engaging hole portion 52 of each engaging hole 50 of the retaining cover 20 as shown in FIG. 9. Further, as shown in FIG. 9, the communication slot 21*a* of the retaining cover 21 communicates with the projection receiving portion 51 of one of the engaging holes 50 (one indicated by reference numeral 50(1) in FIG. 9) that is positioned on the side in the counterclockwise direction (the direction indicated by arrow Z in FIG. 9) of the communication slot 21*a*. The communication slot 21*a* of the retaining cover 21 communicates with the projection receiving portion 51 of the other one of the engaging holes 50 (one indicated by reference numeral 50(2) in FIG. 9) that is positioned on the side in the clockwise direction (the direction indicated by arrow Y in FIG. 9) of the communication slot 21*a*.

Figure 3:
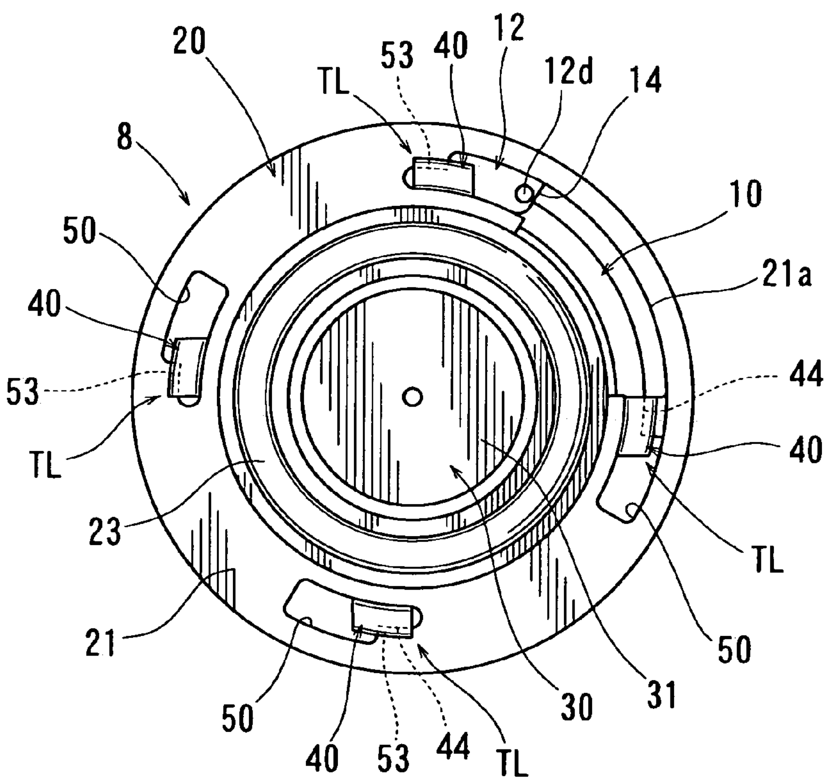
FIG. 3 is a bottom view of the orifice device.

The operation of the above representative embodiment will now be described in connection with the assembling operation for assembling the retaining cover 20 to the orifice casing 10 by using the twist lock mechanism TL. First, the retaining cover 20 is placed to be lapped with the lower surface of the orifice casing 10 (see FIG. 2) so as to fit the engaging projections 40 of the orifice casing 10 into the corresponding engaging holes 50 of the retaining cover as indicated by chain lines in FIG. 9. Then, the retaining cover 20 is rotated relative to the orifice casing 10 in the clockwise direction (the direction indicated by arrow Y in FIG. 9). As a result, the engaging edge 53 of each engaging hole 50 of the retaining cover 20 engages the engaging recess 44 of the corresponding engaging projection 40 of the orifice casing 10. In addition, the engaging edge 53 contacts the rotation prevention wall 43 of the corresponding engaging projection 40. The assembling operation of the retaining cover 20 and the orifice casing 20 is thus completed as shown in FIG. 3. In this assembled state, the removal prevention wall 42 of each engaging projection 40 and the engaging edge 53 of the corresponding engaging hole 50 oppose to each other in the axial direction of the orifice casing 10 or the retaining cover 20. Therefore, the orifice casing 10 and the retaining cover 20 may be prevented from being removed from each other in the axial direction (vertical direction as viewed in FIG. 2). In other words, the orifice casing 10 and the retaining cover 20 may be prevented from being separated from each other. The orifice casing 10 and the retaining cover 20 can be disassembled from each other by reversing the order of the assembling steps.

When the retaining cover 20 is rotated relative to the orifice casing 10 during the assembling operation, a pressing force is applied to press the retaining cover 20 against the orifice casing 10, so that the attaching portion 32 of the flexible membrane 30 is compressed due to its resiliency. Upon completion of the engagement between the engaging projections 40 and the engaging holes 50, the pressing force is released, so that the orifice casing 10 and the pressing cover 20 are urged in opposite direction along their axes away from each other due to the resilient recovering force of the attaching portion 32 of the flexible membrane 30. Therefore, the removal prevention wall 42 of each engaging projection 40 is pressed against the engaging edge 53 of the corresponding engaging hole 50. As a result, any rattling between the orifice casing 10 and the retaining cover 20 can be reduced or minimized. In addition, because the removal prevention wall 42 is pressed against the engaging edge 53, the orifice casing 10 and the retaining cover 20 are prevented from rotating relative to each other in the direction opposite to the direction of rotation during the assembling operation, while the orifice casing 10 and the retaining cover 20 is prevented from being removed from each other in the axial direction. Further, the attaching portion 32 of the flexible membrane 30 can be reliably held in position in the resiliently compressed state by the operation for assembling the retaining cover 20 to the orifice casing 10 with the flexible membrane 30 interposed therebetween.

Preferably, in the assembled state of the orifice casing 10 with the retaining cover 20 within the vibration absorption device M as shown in FIG. 1, the engaging projections 40 may be positioned within a space S that is defined between the retaining cover 20 and the diaphragm 4. Therefore, the engaging projections 40 may not interfere with the diaphragm that resiliently deforms during the operation of the vibration absorption device M. As a result, the space S can be effectively utilized.

Further, as shown in FIG. 3, in this representative embodiment, a position determining projection 12*d* extends downward from the lower end surface of the tubular wall 12 of the orifice casing 10 and enters into the communication slot 21*a* formed in the retaining cover 20 in the assembled state. As shown in FIG. 5, the position determining projection 12*d* is positioned adjacent to one end of the communication opening 14 and between two of the engaging projections 40. The retaining cover 20 can be properly lapped with the orifice casing 10 only when the communication slot 21*a* is positioned to oppose to the position determining projection 12. Therefore, the communication slot 21*a* can be reliably positioned in communication with the communication opening 14 in the assembled state. When the position determination projection 12*d* does not oppose to the communication slot 21*a*, the position determination projection 12*d* abuts to the upper surface of the retaining cover 20. Therefore, in this position, the retaining cover 20 cannot be properly lapped with the orifice casing 10. As a result, an improper assembling operation of the retaining cover 20 to the orifice casing 10 can be reliably prevented and the positional relationship between the retaining cover 20 and the orifice casing 10 during the assembling operation can be easily recognized.

As described above, according to the representative orifice device 8, the orifice casing 10 and the retaining cover 20 can be coupled to each other by means of the twist lock mechanism TL. Therefore, strength of the joint region of the orifice casing 10 and the retaining cover 20 may not be influenced by the press fitting condition or the welding condition that is incident to the conventional techniques. As a result, the flexible membrane 30 can be properly and reliably held between the orifice casing 10 and the retaining cover 20.

In addition, the twist lock mechanism TL is configured such that the engaging edge 53 of each engaging hole 50 engages the engaging recess 44 of the corresponding engaging projection 40 as shown in FIG. 3 by rotating the retaining cover 20 relative to the orifice casing 10 in the state where the engaging projections 40 are fitted into the engaging hole 50 by positioning the retaining cover 20 and the orifice casing 10 to be lapped with each other. Therefore, the twist lock mechanism TL may have a compact construction and can be advantageously incorporated between the retaining cover 20 and the orifice casing 10 that is lapped with the retaining cover 20.

Furthermore, the representative orifice device 8 can be advantageously incorporated into the representative vibration absorption device M, so that the representative orifice device 8 with the flexible membrane 30 properly clamped between the orifice casing 10 and the retaining cover 20 is disposed within the fluid chamber 5 that has at least a wall portion formed by the resilient member 3.

Furthermore, the representative orifice device 8 having the twist lock mechanism TL for coupling the retaining cover 20 to the orifice casing 10 has the following incidental advantages.

(1) No exclusive equipment, such as press working equipment for press-fitting operations and welding equipment for welding operations that are essential to the conventional techniques, is required. Therefore, the equipment costs can be reduced.

(2) The assembled state of the orifice casing 10 and the retaining cover 20 can be easily recognized by a visual inspection in comparison with the assembled state of these elements in case that the conventional press-fitting or welding techniques have been used.

(3) The orifice casing 10 and the retaining cover 20 can be easily disassembled and reassembled if the assembling condition is not proper. Therefore, the rate of occurrence of defective products can be reduced or minimized. Thus, in case of the assembling operation using the conventional press-fitting or welding technique, it is very difficult to disassemble and reassemble the assembled parts. For example, if some of the assembled finish products, e.g., orifice devices, manufactured by lot production have defects, such as improper configurations, unequal sizes and improper set positions of the flexible membranes, all the products of one lot may be defective. In case of the representative embodiment, the defective products can be disassembled and reassembled into proper products.

(4) If the conventional press-fitting technique is used, it is likely that different pressing forces are applied for press-fitting operations of the same products. If the conventional welding technique is used, it is likely that the products are welded with different welding forces. In case of the representative embodiment, there is no factor that leads to different assembling or coupling conditions of the products. Therefore, the same assembling condition can be realized for all the products.

(5) In case of the representative embodiment, a force F1 that is required for assembling the orifice casing 10 and the retaining cover 20 is smaller than a force F2 that is required for disassembling the orifice casing 10 and the retaining cover 20 from each other. Therefore, after the assembling operation, an accidental separation of the orifice casing 10 and the retaining 20 from each other can be prevented or restricted. In contrast, in case of the conventional press-fitting technique, a force G1 that is required for press-fitting a retaining cover into an orifice casing is greater than a force G2 that is required for removing the retaining cover from the orifice casing. Therefore, a possibility has existed that the retaining cover and the orifice casing are accidentally separated from each other.

The present invention may not be limited to the above representative embodiment. The representative embodiment may be modified in various ways within the scope of the invention defined by the appended claims. For example, although the representative vibration absorption device M including the representative orifice device 8 is used for a mount for an automobile engine, the representative vibration absorption device M can also be used for any other mounts for automobiles, such as a cylindrical engine mount,: a body mount and a differential mount, and for absorbing vibrations of any other machines and apparatus than automobiles. Further, although the orifice casing 10 is made of resin in the representative embodiment, the orifice casing 10 may be made of metal, such as aluminum alloy. Furthermore, although the retaining cover 20 is made of metal in the representative embodiment, the retaining cover 2 may be made of resin. A person skilled in the art may make any other modifications, variations and improvement to the representative embodiment within the scope of the invention.

What is claimed is:

1. An orifice device for use with a vibration absorption device and adapted to be disposed within a fluid chamber of the vibration absorption device, the fluid chamber being defined by at least a wall portion made of resilient material, comprising:

an orifice casing;

a retaining cover;

a membrane made of resilient material and arranged and constructed to be clamped between the orifice casing and the retaining cover in an axial direction; and a lock mechanism arranged and constructed to lock the orifice casing and the retaining cover together without substantial movement relative to each other in the axial direction as the orifice casing and the retaining cover rotate relative to each other about an axis while the orifice casing and the retaining cover are lapped with each other; wherein the lock mechanism comprises a first engaging member and a second engaging member disposed on one and the other of the orifice casing and the retaining cover, respectively;

the first engaging member includes an engaging projection in the axial direction and has an engaging recess;

the second engaging member includes an engaging hole and an engaging edge.

2. An orifice device as in claim 1, wherein:

the engaging hole has a projection receiving portion and an engaging portion arranged in series in the rotational direction of the orifice casing or the retaining cover, the projection receiving portion is configured to receive the engaging projection of the first engaging member when the orifice casing and the retaining cover are positioned to be lapped with each other; and the engaging edge is defined by the engaging portion and is configured to engage the engaging recess of the first engaging member, so that the orifice casing and the retaining cover are prevented from being removed from each other in an axial direction, when the retaining cover is rotated in one direction relative to the orifice casing after the engaging projection has been received by the projection receiving portion.

3. An orifice device as in claim 2, wherein the engaging projection further includes a rotation prevention wall that is configured to oppose to the engaging edge in the rotational direction, so that the retaining cover is prevented from rotating further in the rotational direction after the engaging edge has engaged with the engaging recess.

4. An orifice device as in claim 2, wherein the membrane is compressed between the orifice casing and the retaining cover when the engaging edge engages the engaging recess, so that a force is applied by the membrane to press the engaging edge and the engaging projection against each other in the axial direction of the orifice casing or the retaining cover.

5. An orifice device as in claim 2 wherein the first engaging member is disposed on the orifice casing and the second engaging member is disposed on the retaining cover.

6. An orifice device as in claim 5 wherein the first engaging member is formed integrally with the orifice casing and the second engaging member is formed integrally with the retaining cover.

7. An orifice device as in claim 5, wherein a plurality of first engaging members are disposed on an end portion in the axial direction of the orifice casing and are spaced substantially equally from each other in the circumferential direction, and a plurality of second engaging members are disposed on the retaining cover and are spaced substantially equally from each other in the circumferential direction for engagement with the corresponding first engaging members.

8. An orifice device as in claim 7, wherein the first engaging members are formed integrally with the end portion of the orifice casing and the second engaging members are formed integrally with the retaining cover.

9. An orifice device as in claim 8, wherein the orifice casing includes a helical groove formed in an outer peripheral surface thereof, the helical groove has one end that opens at the end portion of the orifice casing via a communication opening, the retaining cover has a communication slot configured to communicate with the communication opening, the engaging projections of two of the first engaging members are disposed on both sides of the communication opening in the circumferential direction, and the engaging holes of two of the second engaging members are disposed on both sides of the communication slot in the circumferential direction in continuity with the communication slot.

10. A vibration absorption device comprising the orifice device as in claim 1.

11. A vibration absorption device as in claim 10, further including:

a first mount arranged and constructed to be mounted on a vehicle engine;

a second mount arranged and constructed to be mounted on a vehicle body;

a resilient member disposed between the first and second mounts and defining the fluid chamber; and a diaphragm disposed within the resilient member at a position below the orifice device, so that the fluid chamber is separated into a pressure receiving section on the upper side of the orifice device and a pressure balancing section on the lower side of the orifice device;

wherein the orifice casing of the orifice device includes a helical groove formed in an outer peripheral surface thereof, so that an orifice channel is formed between the outer peripheral surface of the orifice casing and an inner wall of the fluid chamber and communicates with the pressure receiving section and the pressure balancing section, and the lock mechanism is positioned within the pressure balancing section such that the lock mechanism does not interfere with the diaphragm.

12. A method of assembling an orifice device as in claim 1 comprising:

positioning the orifice casing and the retaining cover to be lapped with each other in the axial direction with the membrane interposed between the orifice casing and the retaining cover;

pressing the orifice casing and the retaining cover against each other in the axial direction, so that a part of the membrane is resiliently deformed;

rotating the orifice casing and the retaining cover relative to each other without substantial movement relative to each other in the axial direction, so that the orifice casing and the retaining cover are locked together by the lock mechanism; and releasing the pressing force applied to the orifice casing and the retaining cover.

13. A method of assembling an orifice device as in claim 2 comprising:

positioning the orifice casing and the retaining cover to be lapped with each other in the axial direction while the membrane is interposed between the orifice casing and the retaining cover; so that the engaging projection of the first engaging member of the lock mechanism is fitted into the projection receiving portion of the engaging hole of the second engaging member of the lock mechanism;

pressing the orifice casing and the retaining cover against each other in the axial direction, so that a part of the membrane is resiliently deformed;

rotating the orifice casing and the retaining cover relative to each other, so that the engaging projection moves from the projection receiving portion to the engaging portion along the engaging hole and the engaging edge of the second engaging portion engages the engaging recess of the first engaging member; and releasing the pressing force applied to the orifice casing and the retaining cover.

* * * * *